US006766827B2

(12) United States Patent
Chen (10) Patent No.: US 6,766,827 B2
(45) Date of Patent: Jul. 27, 2004

(54) CORE SHAFT OF THE CONTROL STICK OF A VERTICAL TYPE FAUCET

(75) Inventor: Mei-Li Chen, Taichung Hsien (TW)

(73) Assignee: Kuching International Inc., Taichung Hsien (TW)

( * ) Notice: Subject to any disclaimer, the term of this patent is extended or adjusted under 35 U.S.C. 154(b) by 116 days.

(21) Appl. No.: 10/255,710

(22) Filed: Sep. 27, 2002

(65) Prior Publication Data

US 2004/0060606 A1 Apr. 1, 2004

(51) Int. Cl.⁷ .............................................. F16K 11/074
(52) U.S. Cl. ................................................... 137/625.4
(58) Field of Search ........................... 137/625, 625.17, 137/625.4

(56) References Cited

U.S. PATENT DOCUMENTS

| | | | | |
|---|---|---|---|---|
| 3,965,936 A | * | 6/1976 | Lyon ........................ | 137/625.4 |
| 4,163,460 A | * | 8/1979 | Zucchetti ................. | 137/625.4 |
| 5,060,692 A | * | 10/1991 | Pawelzik et al. ........ | 137/625.4 |
| 6,321,789 B1 | * | 11/2001 | Chen ..................... | 137/625.17 |

* cited by examiner

Primary Examiner—John Fox
(74) Attorney, Agent, or Firm—Bacon & Thomas, PLLC (57) ABSTRACT

A core shaft of the control stick of a vertical type faucet has a faucet body, a locking ring unit, a valve case, a valve, a core shaft of the control stick, a stick fixing mount, a support base, a switch mount, and a faucet handle wherein the core shaft of the control stick joined to the stick fixing mount, the valve, and the support base respectively, is located onto the switch mount with an arc actuation block of the core shaft thereof inserted into a link activation cavity of the switch mount thereof. The valve case encased the valve and the switch mount therein is adapted to the faucet body and screw joined thereto via the locking ring unit thereof; the core shaft thereof is screw joined to the faucet handle via an externally threaded upper section thereof. In operation, the faucet handle is pushed forwards or downwards, bending said core shaft of the control stick which will move an upper switch valve of said switch mount therewith via the arc actuation block, for water to be channeled via a lower switch valve for the discharge of cold or hot water for use. To adjust water temperature, the faucet handle thereof is first bent forwards and then switched to the right or left to activate the upper switch valve thereof so as to adjust the amount of cold or hot water channeled via the lower switch valve thereof to be discharged at a desirable temperature for use.

3 Claims, 7 Drawing Sheets

FIG. 1

PRIOR ART

FIG. 7 though said control stick is rotated carelessly in a sudden, the temperature of hot water will be limited to prevent the user from being burned by hot water thereof.

CORE SHAFT OF THE CONTROL STICK OF A VERTICAL TYPE FAUCET

BACKGROUND OF THE INVENTION

The present invention is related to a core shaft of the control stick of a vertical type faucet, comprising a faucet body, a locking ring unit, a valve case, a valve, a core shaft of the control stick, a stick fixing mount, a support base, a switch mount and a faucet handle wherein said core shaft of the control stick joined to said stick fixing mount, said valve, and said support base respectively, is located onto said switch mount with an arc actuation block of said core shaft thereof inserted into a link activation cavity of said switch mount thereof, and encased by said valve case therein. Said valve case thereof is then adapted to the faucet body via said locking ring unit, and said core shaft thereof is screw joined to faucet handle via an externally threaded upper section thereof. Via said core shaft thereof to activate said switch mount, the faucet handle can easily and accurately adjust the amount and temperature of cold and hot water discharged for use.

Figure 1:
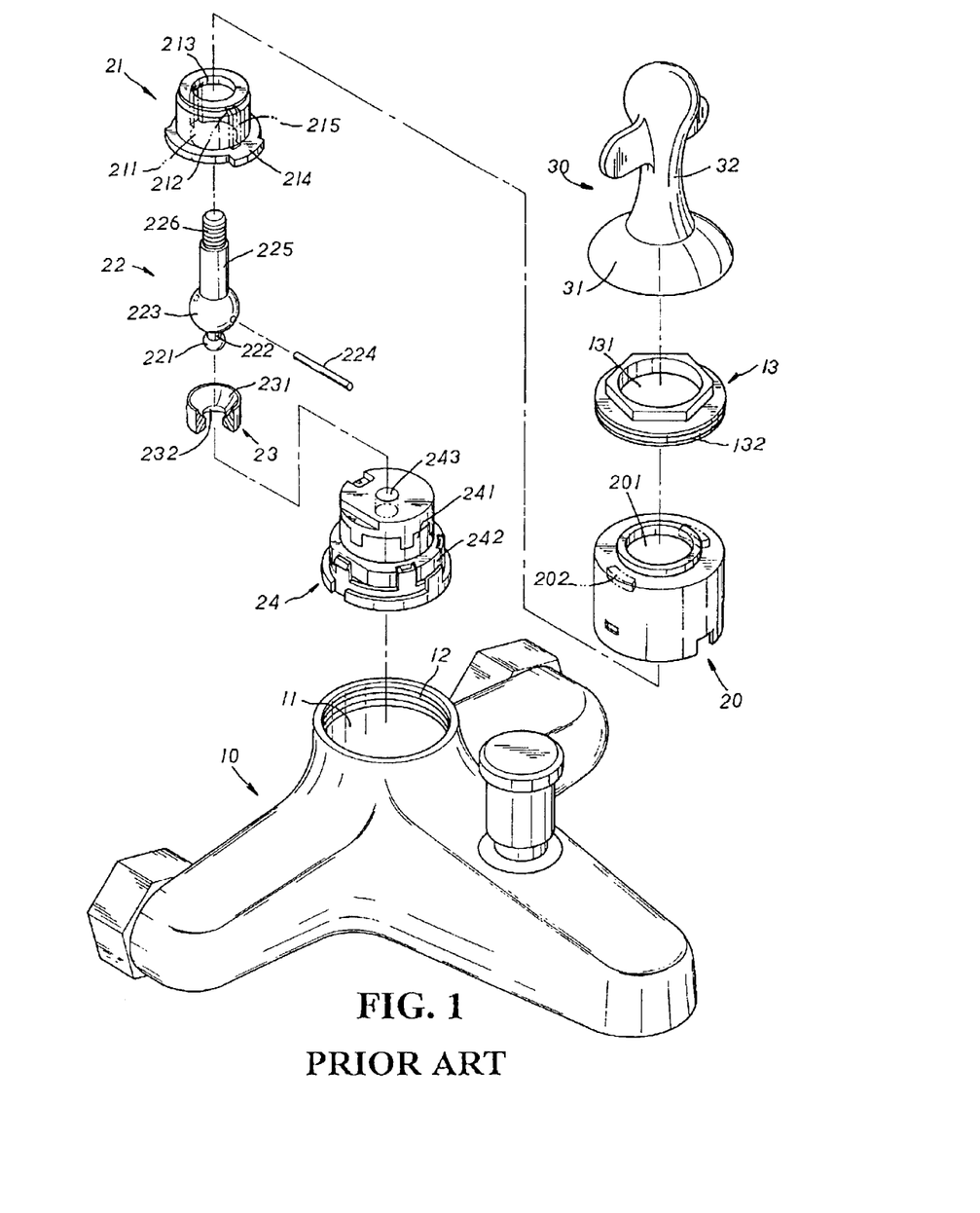
FIG. 1 is a perspective exploded view of a conventional control stick of a faucet.

Please refer to FIG. 1. A conventional the control stick of a faucet is mainly made up of a faucet body 10, a locking ring 13, a valve case 20, a valve 21, a control stick 22, a rotary positioning means 23, a switch mount 24, and a faucet handle 30. Said faucet body 10 is provided with a receiving cavity 11 with an internally threaded locking upper section 12 disposed at the rear center thereof to be communicated with internal water inlet and outlet passages thereof. Said locking ring 13 has a locking hole 131 disposed at the center thereof and externally threaded locking section 132 disposed at the lower outer periphery thereof. Said valve case 20, stepwise, is provided with a valve chamber 201 disposed at the inner side thereof and two limiting blocks 202 disposed at the top of said valve chamber 201 thereof. Said valve 21 is equipped with a through hole 211 disposed at the center thereof, two opposite vertical grooves 215 disposed at the inner periphery thereof, an upper arc abutment facet 212 extending at the upper inner section thereof, an upper tapered recess 213 extending at top of said upper arc abutment facet 212 thereof, and a positioning block 214 extending from the bottom at the outer periphery thereof Said control stick 22 has a small actuation ball 221 disposed at the bottom thereof, a large rotary ball 223 disposed at the lower section thereof, and a link section 222 joining said small actuation ball 221 and said large rotary ball 223 thereof. A post 224 is extending at both ends at the middle of said large rotary ball 223 thereof, and a main shaft body 225 is extending at top of said large rotary ball 223 with an externally threaded upper section 226 disposed at the end thereof Said rotary positioning means 23, hollow-centered with an outer periphery smaller in diameter than the through hole 211 of said valve 21, is provided with a lower arc abutment facet 231, and a lower tapered recess 232 extending at the bottom of said lower arc abutment facet 231 thereof. Said switch mount 24 is made up of an upper switch valve 241 and a lower switch valve 242 wherein said upper switch valve 241 having a link activation cavity 243 disposed at the top thereof can be horizontally moved and rotated on said lower switch valve 242 for the purposes of switching the discharge of hot or cold water thereof. Said faucet handle 30, vertical-typed, has a round-headed bottom 31 and a turning part 32 extending at the upper section thereof.

Figure 2:
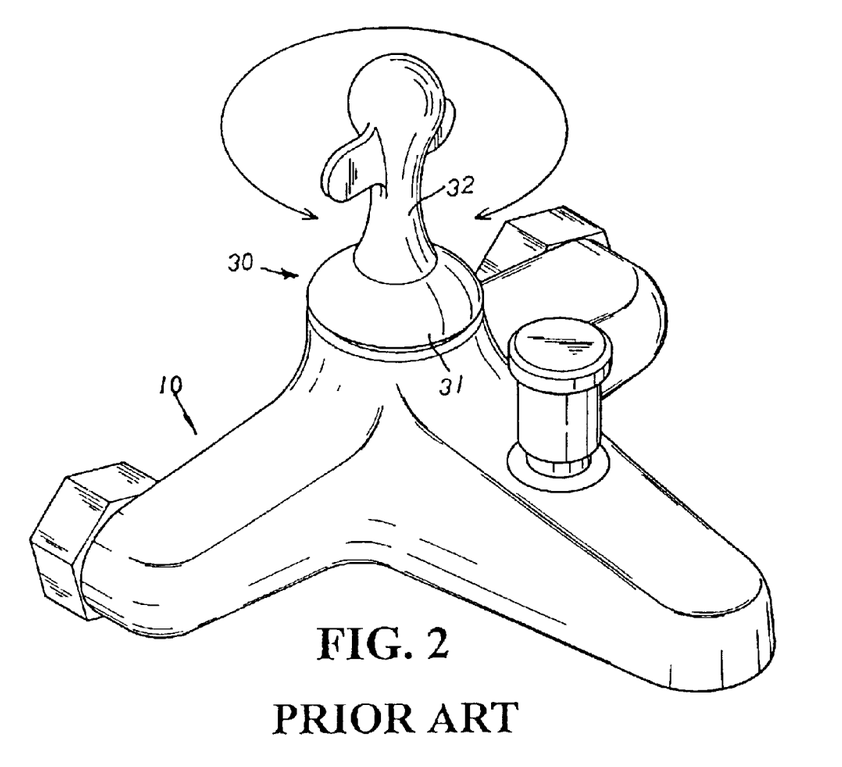
FIG. 2 is perspective view of a conventional control stick of a faucet in assembly and in operation.
Figure 3:
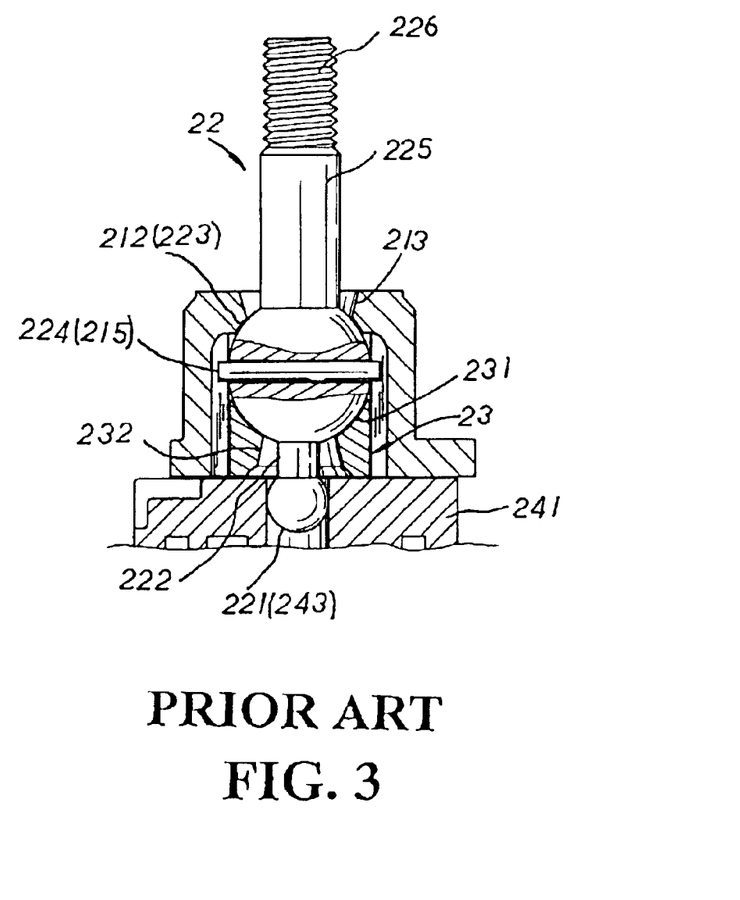
FIG. 3 is partially sectional view of a conventional control stick of a faucet.

Please refer to FIGS. 2, 3. In assembly, said control stick 22 is led through the through hole 211 and joined to said valve 21 from the bottom thereof with said main shaft body 225 extending out at the top thereof. The upper edge of said large rotary ball 223 is abutted against the upper abutment facet 212 thereof, and both ends of said post 224 thereof is adapted to said opposite vertical grooves 215 thereof. Said rotary positioning means 23 is then adapted to the through hole 211 of said valve from the bottom thereof with said link section 222 thereof received at the inner side of said lower tapered recess 232 thereof and said small actuation ball 221 extending out of said rotary positioning means 23 at the bottom thereof. The lower edge of said large rotary ball 223 is abutted against the lower abutment facet 231 thereof, securing locating said rotary positioning means 23 at the inner side of said valve 21 via said through hole 211 thereof. Said valve 21 is then located onto said switch mount 24 with said small actuation ball 221 inserted into said link activation cavity 243 thereof. Said valve case 20 is applied to encase said valve 21 and said switch mount 24 therein with the positioning block 214 of said valve 21 located at the space defined by the two limiting blocks 202 of said valve case thereof for limiting the location and preventing the rotation of said valve 21 thereof. The upper section of said main shaft body 225 thereof is extended out at the top of said valve case 20, and the lower section of said valve case 20 is engaged with the lower outer periphery of said switch mount 24 to complete a switch valve unit which is then adapted to the receiving cavity 11 of said faucet body 40 thereof and screw joined thereto via said locking ring 13. The upper section of said valve 21 is fixedly located at the locking hole 131 of said locking ring 13 thereof and said main shaft body 225 extending out at the top of said valve 21 is screw joined to said faucet handle 30 via said externally threaded upper section 226 thereof to complete the assembly thereof.

Please refer to FIG. 2. In operation, the turning part 32 of said faucet handle 30 is switched either to the left or right to activate the small actuation ball 221 of said control stick 22. Said upper switch valve 241 activated by said small actuation ball 221 to move therewith will slide to either sides thereof for the water inlet to the faucet body 10 thereof to be channeled by said lower switch valve 242 for discharge of cold or hot water. To adjust the temperature of water, said faucet handle 30 is first bent to one side for water to come out and then rotate in either direction to mix the cold and hot water into a proper temperature for use.

There are some drawbacks to such conventional control stick of a faucet. First, said faucet handle 30 is rotated for water to come out of said faucet body 10, and said control stick 22 is switched at either direction to mix said cold and hot water into a proper temperature for use, which is hard to reach in a short period of time and may cause quite a waste of water. Second, it is not only hard to obtain the proper water temperature for use, but also quite easy to get burned by hot water while said control stick is carelessly switched to hot water at a sudden.

SUMMARY OF THE PRESENT INVENTION

It is, therefore, the primary purpose of the present invention to provide a core shaft of the control stick of a vertical type faucet wherein via a core shaft of the control stick joined to a stick fixing mount and a support base, and located onto a switch mount, a faucet handle linked to said core shaft thereof can accurately control the amount and temperature of cold and hot water discharged for use.

It is, therefore, the second purpose of the present invention to provide a core shaft of the control stick of a vertical type faucet wherein said faucet handle facilitated by said core shaft, stick fixing mount, and support base thereof can easily and quickly adjust cold and hot water into a proper temperature for use without wasting any water.

It is, therefore, the third purpose of the present invention to provide a core shaft of the control stick of a vertical type faucet wherein via said core shaft of the control stick to activate said switch mount therewith, said faucet handle can accurately and quickly mix said cold and hot water into a desirable temperature without the danger of getting burned by hot water.

DETAILED DESCRIPTION OF THE PREFERRED EMBODIMENTS

Figure 4:
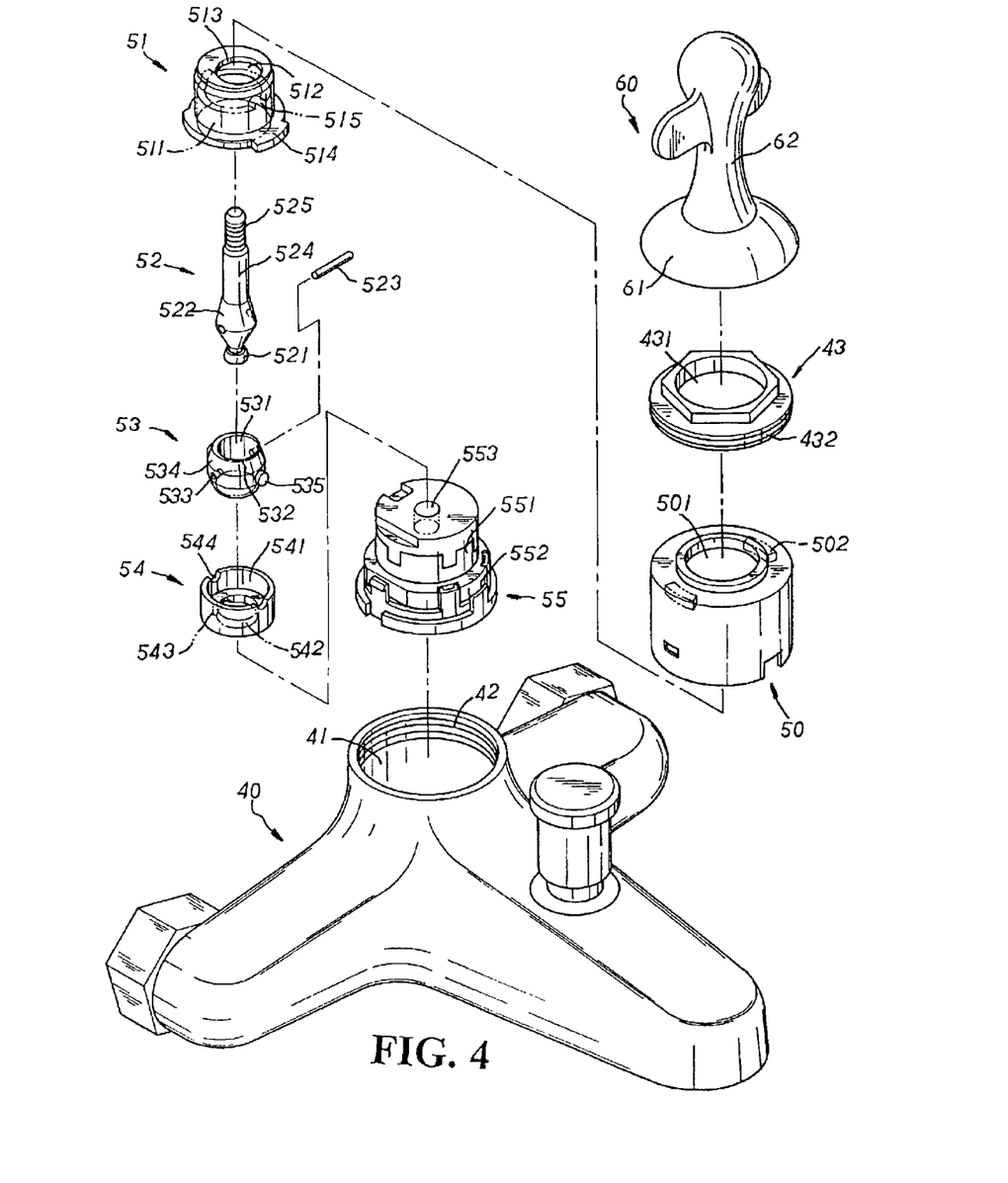
FIG. 4 is a perspective exploded view of the present invention.

Please refer to FIG. 4. The present invention is related to a core shaft of the control stick of a vertical type faucet, comprising a faucet body 40, a locking ring unit 43, a valve case 50, a valve 51, a core shaft of the control stick 52, a stick fixing mount 53, a support base 54, a switch mount 55, and a faucet handle 60.

Said faucet body 40 has a receiving cavity 41 with an internally threaded locking upper section 42 disposed at the rear center thereof to be communicated with internal water inlet and outlet passages thereof. Said locking ring unit 43 has a locking hole 431 disposed at the center thereof and externally threaded locking section 432 disposed at the lower outer periphery thereof. Said valve case 50, stepwise, is provided with a valve chamber 501 disposed at the inner side thereof and two limiting blocks 502 disposed at the top of said valve chamber 501 thereof. Said valve is equipped with a large and a small stepwise cavities 511, 512 disposed at the inner side thereof with a pair of opposite semi-circular abutting flanges 515 disposed at the bottom edge of said small stepwise cavity 512 thereof, an eccentric through hole 513 disposed at the top side thereof, and a positioning block 514 extending from the bottom at the outer periphery thereof. Said core shaft of the control stick 52 is made up of an arc actuation block 521 disposed at the bottom thereof, a bulged lower section 522 extending at the top of said arc actuation block 521 thereof with a post 523 projecting at both ends out of the middle bulged section thereof, a main shaft body 524 extending for a proper length at top of said bulged lower section 522 thereof, and an externally threaded upper section 525 disposed at the top thereof.

Said stick fixing mount 53 is provided with a through hole 531 disposed at the center thereof, and a symmetric tapered facet 534 with a bulged middle section defining the outer periphery thereof. A slant abutment facet 532 is disposed at the upper inner periphery of said through hole 531 thereof; a pair of corresponding slots 533 and two symmetric positioning blocks 535 are respectively disposed at the bulged middle section of said symmetric tapered facet 534 thereof Said support base 54 has a receiving groove 541 disposed at the top thereof, a stop ring 542 disposed at the lower end thereof, an arc recess 543 defining one edge of said stop ring 542 thereof and a pair of symmetric semi-circular cuts 544 defining the upper edge of said receiving groove 541 thereof. Said switch mount 55 is mainly made up of an upper switch valve 551 and a lower switch valve 552 wherein said upper switch valve 551, having a link activation cavity 553 disposed at the top thereof, can be horizontally moved and rotated on said lower switch valve 552 thereof for regulating the discharge and temperature of cold and hot water. Said faucet handle 60, vertical in type (which can also be round-headed, or flat-typed, etc.), has a coupling end 61 disposed at the bottom thereof and a turning part 62 extending at the upper section thereof.

Figure 5:
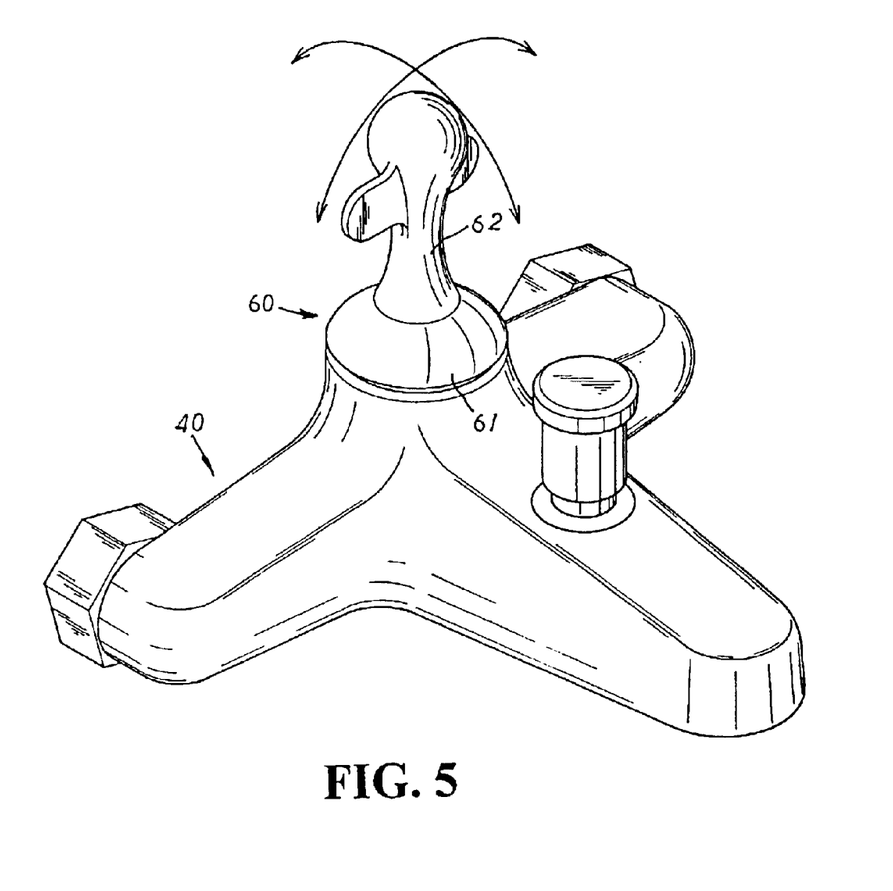
FIG. 5 is perspective view of the present invention in assembly and in operation.
Figure 6:
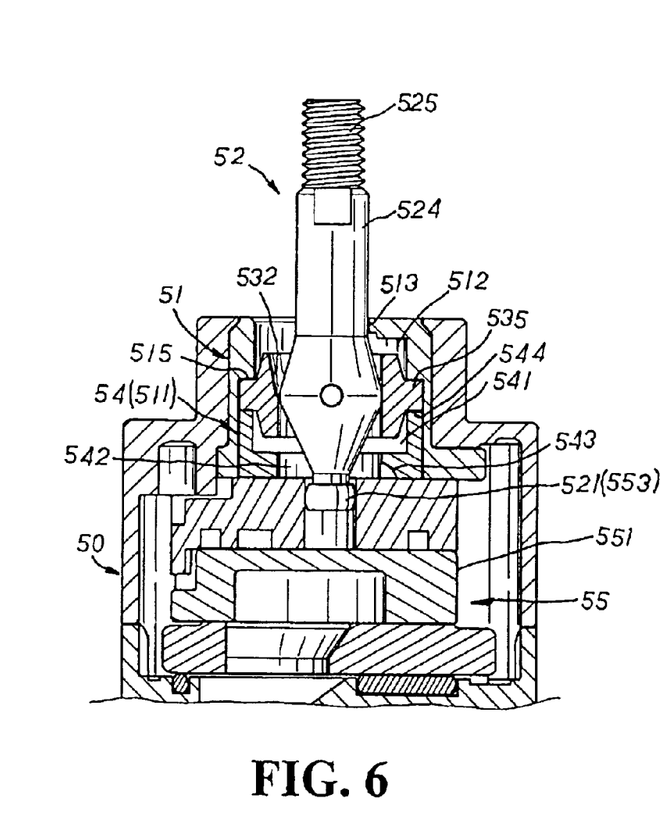
FIG. 6 is a partially sectional view of the present invention in assembly.
Figure 7:
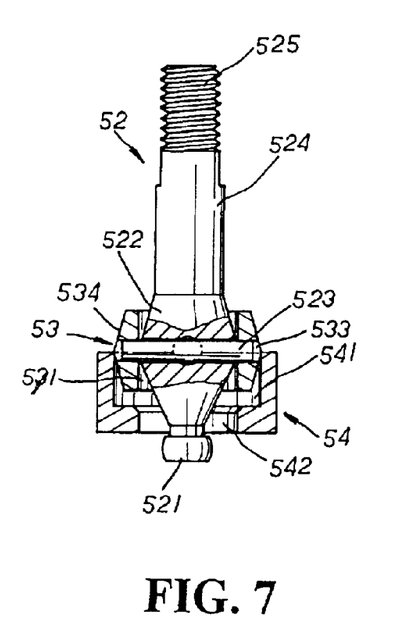
FIG. 7 is another partially sectional view of the present invention.

Please refer to FIGS. 5, 6, and 7. In assembly, said core shaft of the control stick 52 is led through said stick fixing mount 53 from the top thereof with both ends of said post 523 projecting at the bulged lower section 522 thereof inserted into the corresponding slots 533 of said stick fixing mount 53 thereof. Said core shaft thereof 52 joined to said stick fixing mount 53 is adapted to the large stepwise cavity 511 of said valve 51 from the bottom thereof with said main shaft body 524 extending upwards for a proper length at the top of said valve 51 thereof, and the upper edges of the symmetric positioning blocks 535 of said stick fixing mount 53 abutted against the opposite semi-circular abutting flanges 515 of said small stepwise cavity 512 thereof. The upper part of said joined core shaft thereof 52 and stick fixing mount 53 is received at said small stepwise cavity 512 thereof. Said support base 54 is led and joined to said large stepwise cavity 511 from the bottom thereof with said symmetric semi-circular cuts 544 clamped to the lower edges of said symmetric positioning blocks 535 thereof for location. Said valve 51 thereof is then located onto said switch mount 55 with the arc actuation block 521 of said core shaft 52 thereof inserted into the link activation cavity 553 of said switch mount 55. Said valve case 50 is applied to encase said valve 51 and said switch mount 55 therein with the positioning block 514 of said valve 51 located at the space defined by the two limiting blocks 502 of said valve case thereof for both limiting the location and preventing the rotation of said valve 51 thereof. The upper section of said main shaft body 524 thereof is extended upwards at the top of said valve case 50, and the lower section of said valve case 50 is engaged with the lower outer periphery of said switch mount 55 to complete a switch valve unit as shown in FIG. 6. Said switch valve unit thereof is then adapted to the receiving cavity 41 of said faucet body 40 thereof and screw joined thereto via said locking ring unit 43 sleeve joined to the upper section of said valve case 50 thereof. The upper section of said valve 51 is fixedly located at the locking hole 431 of said locking ring unit 43 thereof and said main shaft body 524 extending out of said valve 51 thereof is screw joined to said faucet handle 60 via said externally threaded upper section 525 thereof to complete the assembly of the present invention.

Figure 8:
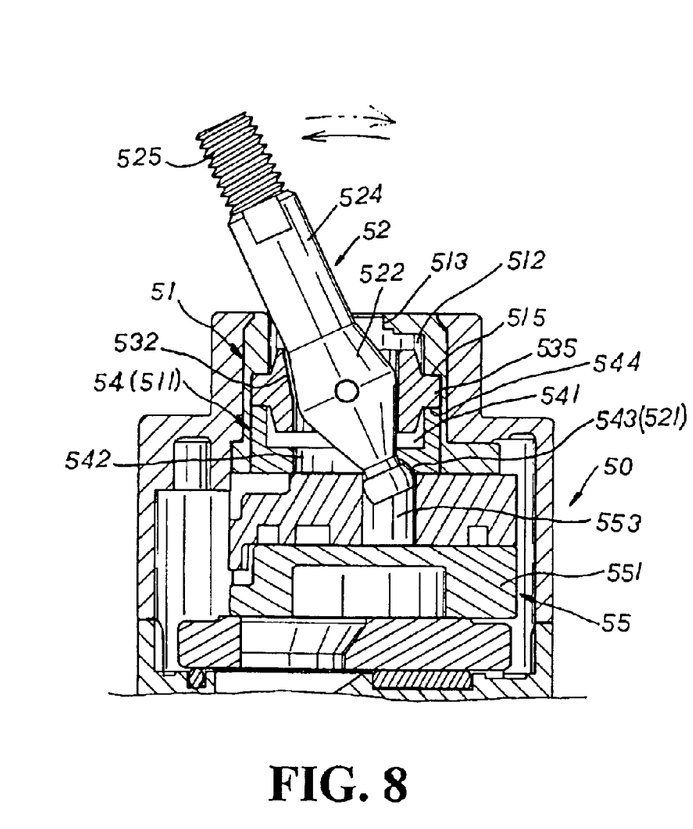
FIG. 8 is a partially sectional view of the present invention in operation.

Please refer to FIG. 8. In operation, the turning part 62 of said faucet handle 60 is pushed forwards or downwards, bending said core shaft of the control stick 52 along with said arc actuation block 521 therewith for the discharge of cold or hot water. The main shaft body 524 of said core shaft 52 thereof will be slant forwards to abut against the slant abutment facet 532 disposed at the upper inner periphery of said stick fixing mount 53 thereof, while said arc actuation block 521 thereof will be lurched backwards to abut against the arc recess 543 disposed at one edge of the stop ring 542 of said support base 54 thereof, pushing said link activation cavity 553 and thus said upper switch valve 551 thereof to move backwards therewith. With said upper switch valve 551 slid to one side upon said lower switch valve 552, water inlet from internal water passages of said faucet body 40 will be channeled via the lower switch valve 552 of said switch mount 55 for proper discharge of cold or hot water for use.

Figure 9:
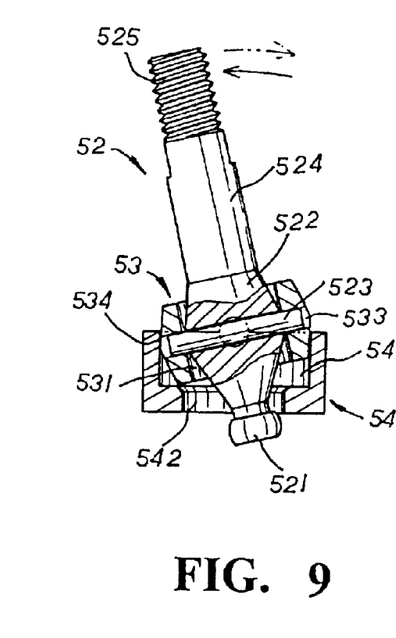
FIG. 9 is a partially sectional view of the present invention in adjustment of cold and hot water.

Please refer to FIG. 9. To adjust the temperature of cold and hot water discharged, the turning part 62 of said faucet handle 60 is first bent forwards or downwards, having said upper switch valve 552 thereof slid to one side for the discharge of water from water passages thereof. Said turning part 62 thereof is switched to the right or left, bringing said core shaft of the control stick 52 along with said arc actuation block 521 to move therewith. The post 523 disposed at the middle of the lower bulged section 522 of said core shaft 52 thereof and inserted at both ends to the corresponding slots 533 of said stick fixing mount 53 will move said stick fixing mount 53 thereof to abut against one side of the receiving groove 541 of said support base 54 thereof by said symmetric tapered facet 534 thereof. Said arc actuation block 521 thereof lurched to either left or right side thereof will move said link actuation cavity 553 and thus said upper switch valve 551 therewith. Said upper switch valve 551 is switched either to the left or right to adjust the amount of cold or hot water channeled via said lower switch valve 552 thereof for discharge. The movement of said turning part 62 thereof is stopped when a desirable temperature is obtained for constant discharge of the mixed cold and hot water thereof.

What is claimed is:

1. A core shaft of the control stick of a vertical type faucet, comprising a faucet body, a locking ring unit, a valve case, a valve, a core shaft of the control stick, a stick fixing mount, a support base, a switch mount, and a faucet handle wherein said faucet body has a receiving cavity with an internally threaded locking upper section disposed at the rear center thereof to be communicated with internal water inlet and outlet passages thereof, and said locking ring unit has a locking hole disposed at the center thereof and externally threaded locking section disposed at the lower outer periphery thereof; said present invention characterized by that, said valve case, stepwise, having a valve chamber disposed at the inner side thereof and two limiting blocks disposed at the top of said valve chamber thereof;

said valve having a large and a small stepwise cavities disposed at the inner side thereof with a pair of opposite semi-circular abutting flanges disposed at the bottom edge of said small stepwise cavity thereof, an eccentric through hole disposed at the top side thereof, and a positioning block extending outwards at the bottom of the outer periphery thereof;

said core shaft of the control stick being made up of an arc actuation block disposed at the bottom thereof, a bulged lower section extending at the top of said arc actuation block thereof with a post projecting at both ends out of the middle bulged section thereof, a main shaft body extending for a proper length at top of said bulged lower section thereof, and an externally threaded upper section disposed at the top thereof;

said stick fixing mount having a through hole disposed at the center thereof, a symmetric tapered facet with a bulged middle section defining the outer periphery thereof, a slant abutment facet disposed at the upper inner periphery of said through hole thereof, and a pair of corresponding slots and two symmetric positioning blocks disposed respectively at the bulged middle section of said symmetric tapered facet thereof;

said support base having a receiving groove disposed at the top thereof, a stop ring disposed at the lower end thereof, an arc recess defining one edge of said stop ring thereof and a pair of symmetric semi-circular cuts defining the upper edge of said receiving groove thereof;

said switch mount being made up of an upper switch valve and a lower switch valve wherein said upper switch valve, having a link activation cavity disposed at the top thereof, can be horizontally moved and rotated on said lower switch valve thereof for regulating the discharge and temperature of cold and hot water;

said faucet handle, vertical in type, has a coupling end disposed at the bottom thereof and a turning part extending at the upper section thereof;

in assembly, said core shaft of the control stick joined to said stick fixing mount is adapted to the large stepwise cavity of said valve thereof with the upper part of said joined core shaft thereof and stick fixing mount received at said small stepwise cavity thereof, and said support base is led and joined to said large stepwise cavity from the bottom thereof; said valve thereof is then located onto said switch mount with the arc actuation block of said core shaft thereof inserted into the link activation cavity of said switch mount thereof; said valve case is adapted to encase said valve and said switch mount therein to complete a switch valve unit which is then adapted to the receiving cavity of said faucet body thereof and screw joined thereto via said locking ring unit thereof; said main shaft body thereof extending out of said valve thereof is screw joined to said faucet handle via said externally threaded upper section thereof to complete the assembly;

whereby, in operation, the turning part of said faucet handle is pushed forwards or downwards, bending said core shaft of the control stick along with said arc actuation block which will activate said link activation cavity and said upper switch valve to move backwards for cold and hot water to be channeled via said lower switch valve for the discharge thereof for use; or, to adjust the water temperature, said faucet handle thereof is first bent forwards and then switched to the right or left to activate said upper switch valve therewith via said arc actuation block so as to adjust the amount of cold or hot water channeled via said lower switch valve thereof for use.

2. The core shaft of the control stick of a vertical type faucet as claimed in claim I wherein said faucet handle thereof can be formed in other shapes such as round-headed, and flat-typed, etc.

3. The core shaft of the control stick of a vertical type faucet as claimed in claim I wherein the small stepwise cavity of said valve is provided with a pair of opposite semi-circular abutting flanges matching to a pair of symmetric semi-circular cuts disposed at the upper edge of said support base so as to securely clamp two symmetric positioning blocks of said stick fixing mount therein for location thereof.

* * * * *